(12) United States Patent
Martemianov et al.

(10) Patent No.: US 12,555,322 B2
(45) Date of Patent: Feb. 17, 2026

(54) COMPRESSION OF MESH GEOMETRY BASED ON 3D PATCH CONTOURS

(71) Applicant: Nokia Technologies Oy, Espoo (FI)

(72) Inventors: Aleksei Martemianov, Tampere (FI); Sebastian Schwarz, Unterhaching (DE); Patrice Rondao Alface, Evere (BE); Lauri Aleksi Ilola, Munich (DE); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 218 days.

(21) Appl. No.: 18/121,821

(22) Filed: Mar. 15, 2023

(65) Prior Publication Data

US 2023/0326138 A1 Oct. 12, 2023

Related U.S. Application Data

(60) Provisional application No. 63/323,322, filed on Mar. 24, 2022.

(51) Int. Cl.
*G06T 17/20* (2006.01)
*G06T 9/00* (2006.01)
*H04N 19/597* (2014.01)

(52) U.S. Cl.
CPC ............ *G06T 17/20* (2013.01); *G06T 9/001* (2013.01); *H04N 19/597* (2014.11)

(58) Field of Classification Search
CPC ........ G06T 17/20; G06T 9/001; H04N 19/597
See application file for complete search history.

(56) References Cited

U.S. PATENT DOCUMENTS

| | | | |
|---|---|---|---|
| 6,587,104 B1* | 7/2003 | Hoppe | G06T 17/20 345/441 |
| 11,948,338 B1* | 4/2024 | Mammou | G06T 3/4023 |
| 2012/0262444 A1* | 10/2012 | Stefanoski | G06T 9/001 345/419 |

(Continued)

OTHER PUBLICATIONS

ISO/IEC JTC 1/SC 29/WG 11 "ISO/IEC FDIS 23090-5 Visual Volumetric Video-Based Coding and Video-based Point Cloud Compression" Sep. 21, 2020.

(Continued)

*Primary Examiner* — Said Broome
*Assistant Examiner* — Jordan Wan Yick
(74) *Attorney, Agent, or Firm* — McCarter & English, LLP; Joseph C. Drish

(57) ABSTRACT

An apparatus includes one or more processors, and one or more memories storing instructions that, when executed by the one or more processors, cause the apparatus to: segment, for a frame of three-dimensional object data, a mesh of the three-dimensional object data into one or more patches; determine contours of the one or more patches, wherein the contours of the one or more patches comprise one or more vertices having one or more connected neighboring vertices belonging to another patch, or one or more vertices on a border of the mesh; generate a contour mesh of the three-dimensional object data using the contours of the one or more patches, wherein the contour mesh comprises a plurality of the one or more patches; and encode the contour mesh of the three-dimensional object data into a bitstream using a coding method.

20 Claims, 13 Drawing Sheets

(56) References Cited

U.S. PATENT DOCUMENTS

2021/0090301 A1* 3/2021 Mammou ............ H04N 19/20
2022/0108483 A1* 4/2022 Graziosi ............ H04N 19/597

OTHER PUBLICATIONS

Wikipedia "Polygon Mesh" https://en.wikipedia.org/wiki/Polygon_mesh retrieved Jun. 15, 2023.
Draco "3D Data Compression" https://google.github.io/draco retrieved Jun. 28, 2023.

* cited by examiner

COMPRESSION OF MESH GEOMETRY BASED ON 3D PATCH CONTOURS

RELATED APPLICATION

This application claims priority to U.S. Provisional Application No. 63/323,322, filed Mar. 24, 2022, which is hereby incorporated by reference in its entirety.

TECHNICAL FIELD

The examples and non-limiting embodiments relate generally to volumetric video coding, and more particularly, to compression of mesh geometry based on 3D patch contours.

BACKGROUND

It is known to perform encoding and decoding of images and video.

SUMMARY

In accordance with an aspect, an apparatus includes: at least one processor; and at least one memory storing instructions that, when executed by the at least one processor, cause the apparatus at least to: segment, for a frame of three-dimensional object data, a mesh of the three-dimensional object data into at least one patch; determine contours of the at least one patch, wherein the contours of the at least one patch comprise at least one vertex having at least one connected neighboring vertex belonging to another patch, or at least one vertex on a border of the mesh; generate a contour mesh of the three-dimensional object data using the contours of the at least one patch, wherein the contour mesh comprises a plurality of the at least one patch; and encode the contour mesh of the three-dimensional object data into a bitstream using a coding method.

In accordance with an aspect, an apparatus includes: at least one processor; and at least one memory storing instructions that, when executed by the at least one processor, cause the apparatus at least to: decode, for a frame of three-dimensional object data, a base mesh of the three-dimensional object data, wherein the base mesh has been generated using contours of at least one patch of a mesh of the three-dimensional object data; wherein the base mesh of three-dimensional object data has been encoded into a bitstream using a coding method; decode, for the frame, the at least one patch of the mesh of the three-dimensional object data, wherein the base mesh comprises a plurality of the at least one patch; and combine patches of the plurality of the at least one patch to reconstruct the mesh of the three-dimensional object data, based on the decoded base mesh and the decoded at least one patch.

In accordance with an aspect, an apparatus includes: at least one processor; and at least one memory storing instructions that, when executed by the at least one processor, cause the apparatus at least to: signal within a bitstream a flag indicating the presence of a multiplexed contour mesh of three-dimensional object data; signal within the bitstream whether the contour mesh has been predictively encoded; signal within the bitstream a predictive function, in response to the contour mesh having been predictively encoded; signal within the bitstream a flag indicating whether delta values have been encoded for geometry data of the contour mesh; and signal contour points used to combine patch borders of the contour mesh.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1A:
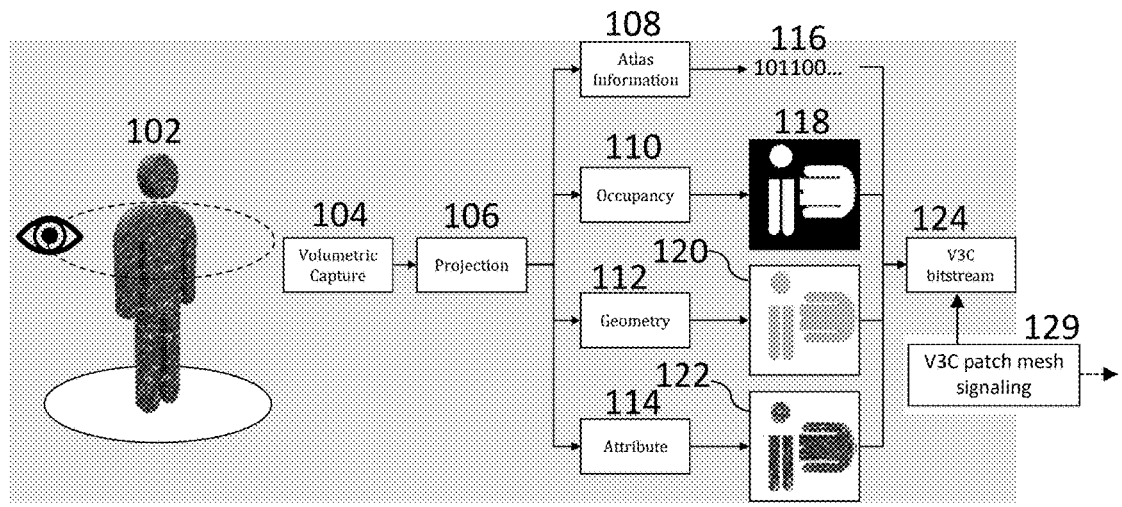
FIG. 1A is a diagram showing volumetric media conversion at an encoder side.

The examples described herein relate to the encoding, signaling and rendering of a volumetric video that is based on mesh coding. The examples described herein focus on methods improving the quality of reconstructed mesh surfaces. The examples described herein relate to methods to improve quality of decoded mesh textures and geometry by using its hierarchical representation which as a consequence increases compression efficiency of the encoding pipeline.

Volumetric Video Data

Volumetric video data represents a three-dimensional scene or object and can be used as input for AR, VR and MR applications. Such data describes geometry (shape, size, position in 3D-space) and respective attributes (e.g. color, opacity, reflectance, . . . ), plus any possible temporal transformations of the geometry and attributes at given time instances (like frames in 2D video). Volumetric video is either generated from 3D models, i.e. CGI, or captured from real-world scenes using a variety of capture solutions, e.g. multi-camera, laser scan, combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for AR, VR, or MR applications, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as a set of textures and a depth map as is the case in the multi-view plus depth framework. Closely related to the techniques used in multi-view plus depth is the use of elevation maps, and multi-level surface maps.

MPEG Visual Volumetric Video-Based Coding (V3C)

Selected excerpts from the ISO/IEC 23090-5 Visual Volumetric Video-based Coding and Video-based Point Cloud Compression 2nd Edition standard are referred to herein.

Visual volumetric video, a sequence of visual volumetric frames, if uncompressed, may be represented by a large amount of data, which can be costly in terms of storage and transmission. This has led to the need for a high coding efficiency standard for the compression of visual volumetric data.

The V3C specification enables the encoding and decoding processes of a variety of volumetric media by using video and image coding technologies. This is achieved through first a conversion of such media from their corresponding 3D representation to multiple 2D representations, also referred to as V3C components, before coding such information. Such representations may include occupancy, geometry, and attribute components. The occupancy component can inform a V3C decoding and/or rendering system of which samples in the 2D components are associated with data in the final 3D representation. The geometry component contains information about the precise location of 3D data in space, while attribute components can provide additional properties, e.g. texture or material information, of such 3D data. An example is shown in FIG. 1A and FIG. 1B.

Figure 1B:
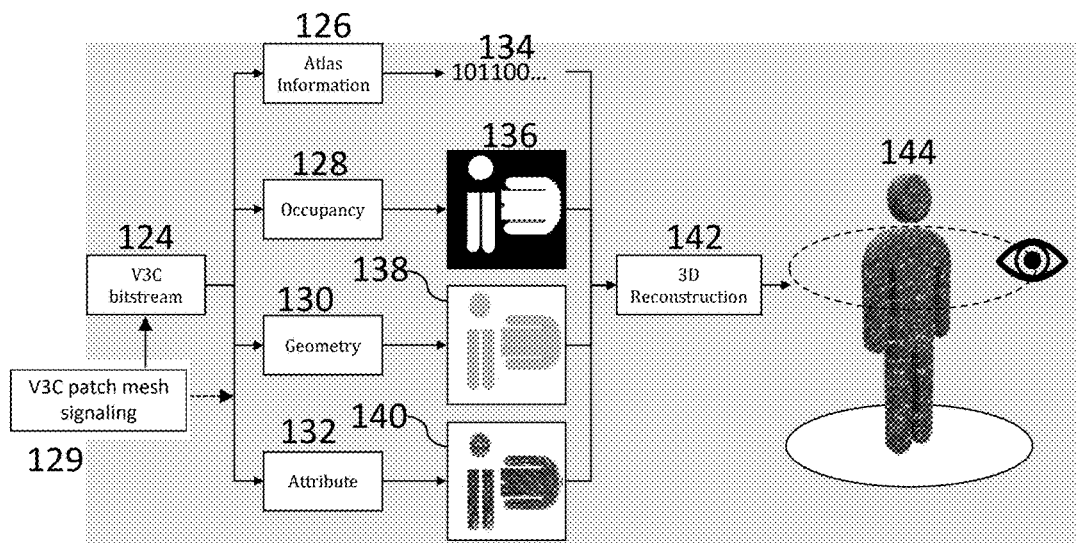
FIG. 1B is a diagram showing volumetric media reconstruction at a decoder side.

FIG. 1A shows volumetric media conversion at the encoder, and FIG. 1B shows volumetric media conversion at the decoder side. The 3D media 102 is converted to a series of 2D representations: occupancy 118, geometry 120, and attribute 122. Additional atlas information 108 is also included in the bitstream to enable inverse reconstruction. Refer to ISO/IEC 23090-5.

As further shown in FIG. 1A, a volumetric capture operation 104 generates a projection 106 from the input 3D media 102. In some examples, the projection 106 is a projection operation. From the projection 106, an occupancy operation 110 generates the occupancy 2D representation 118, a geometry operation 112 generates the geometry 2D representation 120, and an attribute operation 114 generates the attribute 2D representation 122. The additional atlas information 108 is included in the bitstream 116. The atlas information 108, the occupancy 2D representation 118, the geometry 2D representation 120, and the attribute 2D representation 122 are encoded into the V3C bitstream 124 to encode a compressed version of the 3D media 102. Based on the examples described herein, V3C patch mesh signaling 129 may also be signaled in the V3C bitstream 124 or directly to a decoder. The V3C patch mesh signaling 129 may be used on the decoder side, as shown in FIG. 1B.

As shown in FIG. 1B, a decoder using the V3C bitstream 124 derives 2D representations using an occupancy operation 128, a geometry operation 130 and an attribute operation 132. The atlas information operation 126 provides atlas information into a bitstream 134. The occupancy operation 128 derives the occupancy 2D representation 136, the geometry operation 130 derives the geometry 2D representation 138, and the attribute operation 132 derives the attribute 2D representation 140. The 3D reconstruction operation 142 generates a decompressed reconstruction 144 of the 3D media 102, using the atlas information 126/134, the occupancy 2D representation 136, the geometry 2D representation 138, and the attribute 2D representation 140.

Additional information that allows associating all these subcomponents and enables the inverse reconstruction, from a 2D representation back to a 3D representation is also included in a special component, referred to herein as the atlas. An atlas consists of multiple elements, namely patches. Each patch identifies a region in all available 2D components and contains information necessary to perform the appropriate inverse projection of this region back to the 3D space. The shape of such regions is determined through a 2D bounding box associated with each patch as well as their coding order. The shape of these regions is also further refined after the consideration of the occupancy information.

Figure 2:
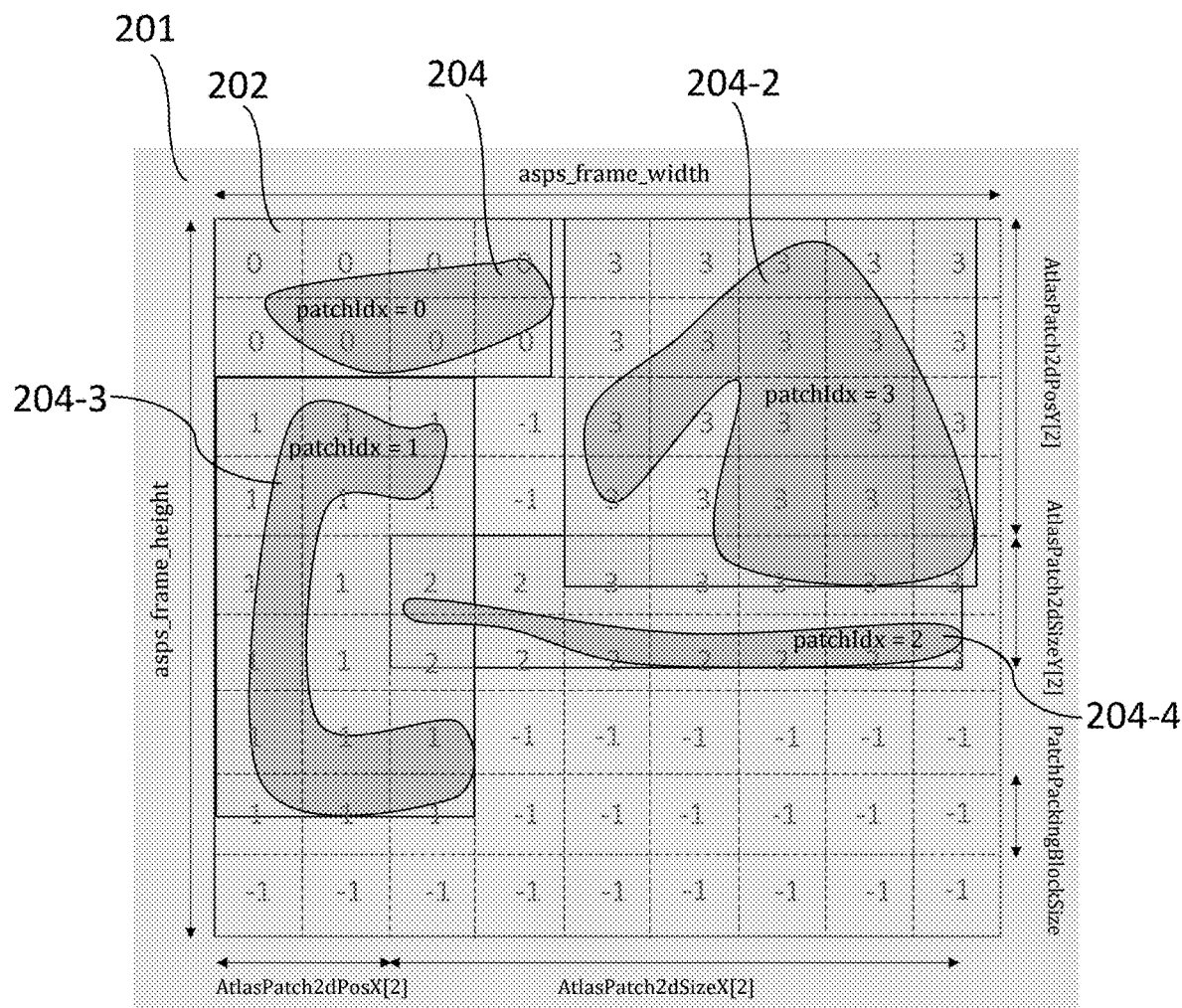
FIG. 2 shows an example of block to patch mapping.

Atlases are partitioned into patch packing blocks of equal size. Refer for example to block 202 in FIG. 2, where FIG. 2 shows an example of block to patch mapping. The 2D bounding boxes of patches and their coding order determine the mapping between the blocks of the atlas image and the patch indices. FIG. 2 shows an example of block to patch mapping with 4 projected patches (204, 204-2, 204-3, 204-4) onto an atlas 201 when asps_patch_precedence_order_flag is equal to 0. Projected points are represented with dark gray. The area that does not contain any projected points is represented with light grey. Patch packing blocks 202 are represented with dashed lines. The number inside each patch packing block 202 represents the patch index of the patch (204, 204-2, 204-3, 204-4) to which it is mapped.

Axes orientations are specified for internal operations. For instance, the origin of the atlas coordinates is located on the top-left corner of the atlas frame. For the reconstruction step, an intermediate axes definition for a local 3D patch coordinate system is used. The 3D local patch coordinate system is then converted to the final target 3D coordinate system using appropriate transformation steps.

Figure 3A:
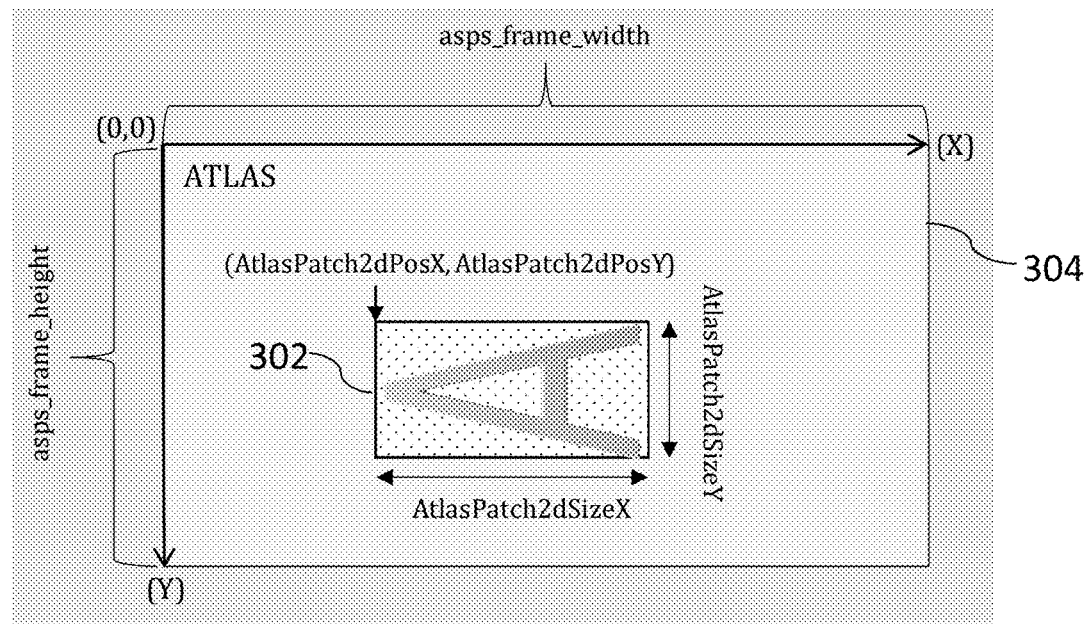
FIG. 3A shows an example of an atlas coordinate system.
Figure 3B:
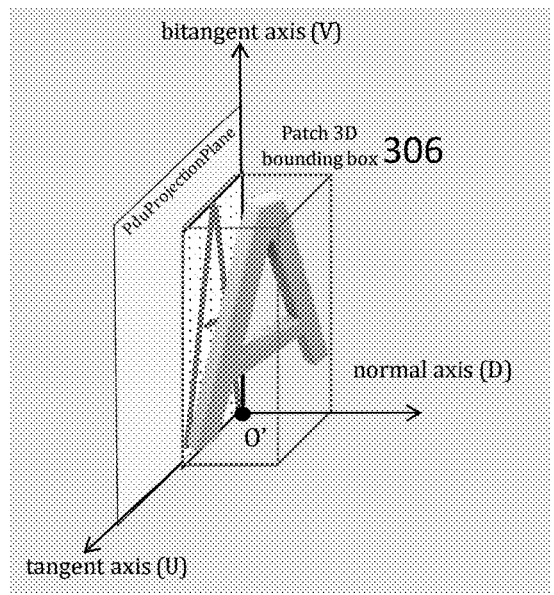
FIG. 3B shows an example of a local 3D patch coordinate system.
Figure 3C:
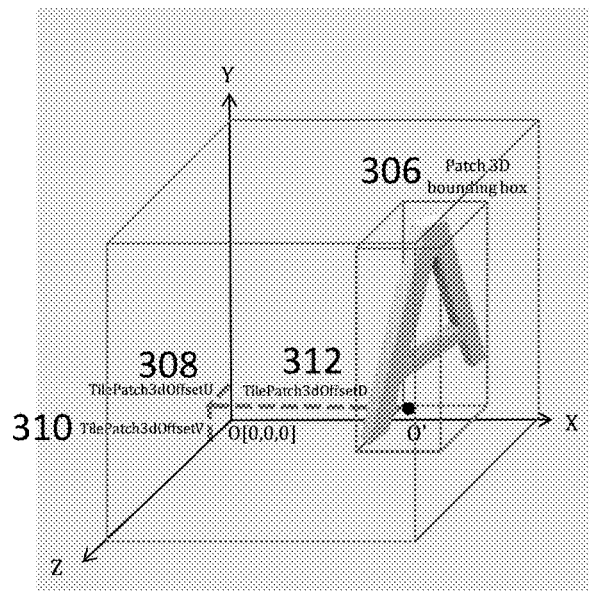
FIG. 3C shows an example of a final target 3D coordinate system.

FIG. 3A shows an example of an atlas coordinate system, FIG. 3B shows an example of a local 3D patch coordinate system, and FIG. 3C shows an example of a final target 3D coordinate system. Refer to ISO/IEC 23090-5.

FIG. 3A shows an example of a single patch 302 packed onto an atlas image 304. This patch 302 is then converted, with reference to FIG. 3B, to a local 3D patch coordinate system (U, V, D) defined by the projection plane with origin O', tangent (U), bi-tangent (V), and normal (D) axes. For an orthographic projection, the projection plane is equal to the sides of an axis-aligned 3D bounding box 306, as shown in FIG. 3B. The location of the bounding box 306 in the 3D model coordinate system, defined by a left-handed system with axes (X, Y, Z), can be obtained by adding offsets TilePatch3dOffsetU 308, TilePatch3DOffsetV 310, and TilePatch3DOffsetD 312, as illustrated in FIG. 3C.

V3C High Level Syntax

Coded V3C video components are referred to herein as video bitstreams, while an atlas component is referred to as the atlas bitstream. Video bitstreams and atlas bitstreams may be further split into smaller units, referred to herein as video and atlas sub-bitstreams, respectively, and may be interleaved together, after the addition of appropriate delimiters, to construct a V3C bitstream.

V3C patch information is contained in an atlas bitstream, atlas_sub_bitstream( ), which contains a sequence of NAL units. A NAL unit is specified to format data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and sample streams is identical except that in the sample stream format specified in Annex D of ISO/IEC 23090-5 each NAL unit can be preceded by an additional element that specifies the size of the NAL unit.

NAL units in an atlas bitstream can be divided into atlas coding layer (ACL) and non-atlas coding layer (non-ACL) units. The former is dedicated to carry patch data, while the latter is dedicated to carry data necessary to properly parse the ACL units or any additional auxiliary data.

In the nal_unit_header( ) syntax nal_unit_type specifies the type of the RBSP data structure contained in the NAL unit as specified in Table 4 of ISO/IEC 23090-5. nal_layer_id specifies the identifier of the layer to which an ACL NAL unit belongs or the identifier of a layer to which a non-ACL NAL unit applies. The value of nal_layer_id shall be in the range of 0 to 62, inclusive. The value of 63 may be specified in the future by ISO/IEC. Decoders conforming to a profile specified in Annex A of ISO/IEC 23090-5 shall ignore (i.e., remove from the bitstream and discard) all NAL units with values of nal_layer_id not equal to 0.

V3C Extension Mechanisms

While designing the V3C specification it was envisaged that amendments or new editions can be created in the future. In order to ensure that the first implementations of V3C decoders are compatible with any future extension, a number of fields for future extensions to parameter sets were reserved.

For example, the second edition of V3C introduced extensions in VPS related to MIV and the packed video component.

```
...
    vps_extension_present_flag                              u(1)
    if( vps_extension_present_flag ) {
        vps_packing_information_present_flag                u(1)
        vps_miv_extension_present_flag                      u(1)
        vps_extension_6bits                                 u(6)
    }
    if( vps_packing_information_present_flag ) {
        for( k = 0 ; k <= vps_atlas_count_minus1; k++ ) {
            j = vps_atlas_id[ k ]
            vps_packed_video_present_flag[ j ]
            if( vps_packed_video_present_flag[ j ] )
                packing_information( j )
        }
    }
    if( vps_miv_extension_present_flag )
        vps_miv_extension( )
```

```
/*Specified in ISO/IEC 23090-12 (Under preparation.
Stage at time of publication: ISO/IEC FDIS 23090-12:2022)*/
    if( vps_extension_6bits ) {
        vps_extension_length_minus1                         ue(v)
        for(j = 0; j < vps_extension_length_minus1 + 1; j++ ) {
            vps_extension_data_byte                         u(8)
        }
    }
    byte_alignment( )
}
```

Rendering and Meshes

A polygon mesh is a collection of vertices, edges and faces that defines the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

Figure 4:
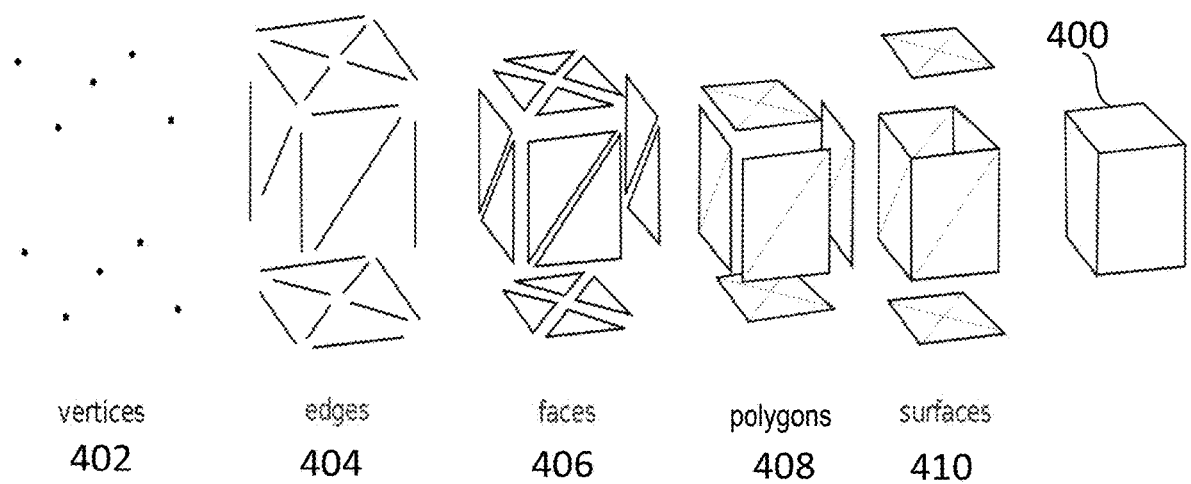
FIG. 4 shows elements of a mesh.

With reference to FIG. 4, objects 400 created with polygon meshes are represented by different types of elements. These include vertices 402, edges 404, faces 406, polygons 408 and surfaces 410 as shown in FIG. 4. Thus, FIG. 4 illustrates elements of a mesh.

Polygon meshes are defined by the following elements:

Vertex (402): a position in 3D space defined as (x, y, z) along with other information such as color (r, g, b), normal vector and texture coordinates.

Edge (404): a connection between two vertices.

Face (406): a closed set of edges 404, in which a triangle face has three edges, and a quad face has four edges. A polygon 408 is a coplanar set of faces 406. In systems that support multi-sided faces, polygons and faces are equivalent. Mathematically a polygonal mesh may be considered an unstructured grid, or undirected graph, with additional properties of geometry, shape and topology.

Surfaces (410): or smoothing groups, are useful, but not required to group smooth regions.

Groups: some mesh formats contain groups, which define separate elements of the mesh, and are useful for determining separate sub-objects for skeletal animation or separate actors for non-skeletal animation.

Materials: defined to allow different portions of the mesh to use different shaders when rendered.

UV coordinates: most mesh formats also support some form of UV coordinates which are a separate 2D representation of the mesh "unfolded" to show what portion of a 2-dimensional texture map to apply to different polygons of the mesh. It is also possible for meshes to contain other such vertex attribute information such as color, tangent vectors, weight maps to control animation, etc. (sometimes also called channels).

V-PCC Mesh Coding Extension (MPEG M49588)

Figure 5:
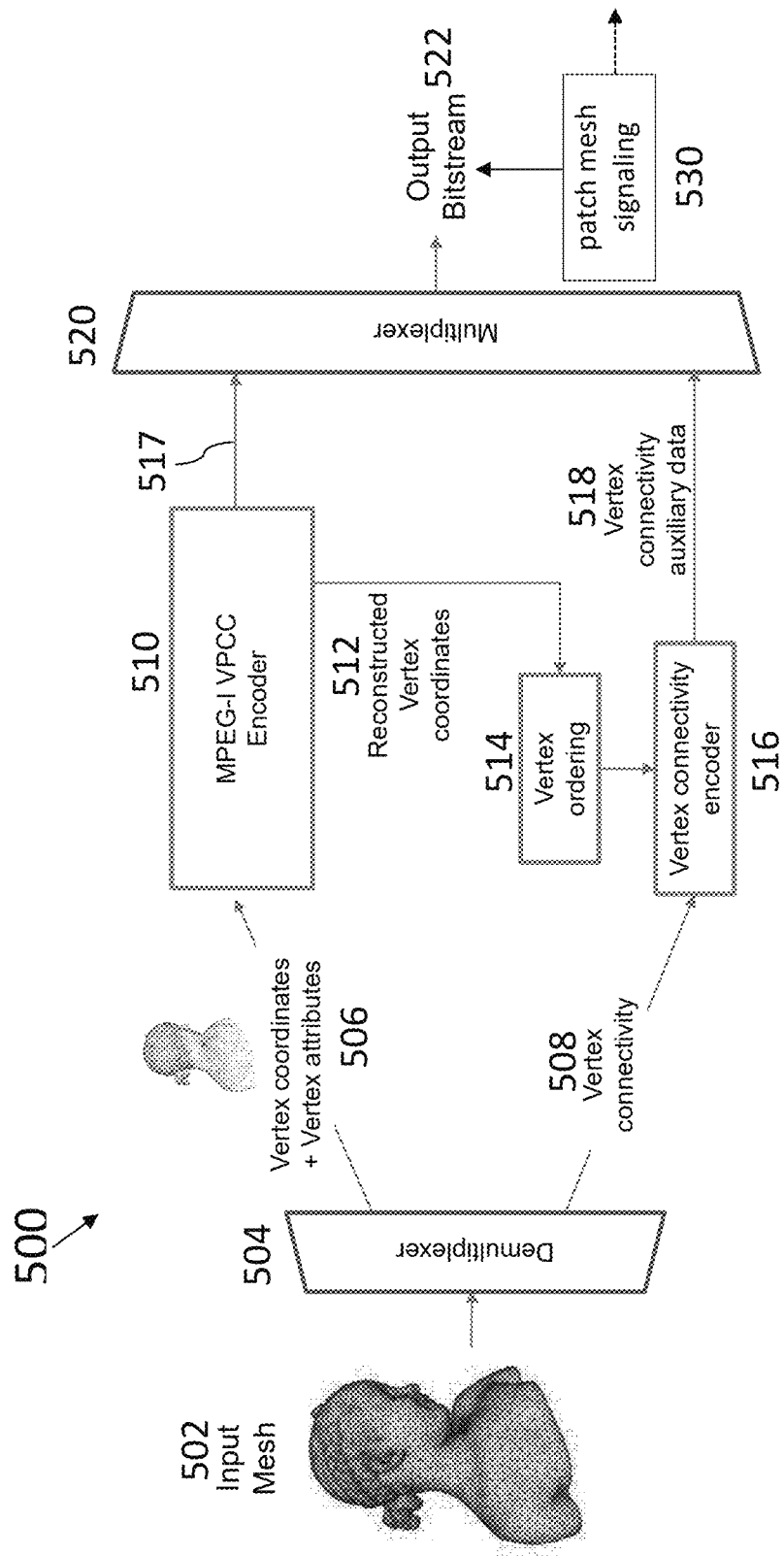
FIG. 5 shows an example V-PCC extension for mesh encoding, based on the embodiments described herein.
Figure 6:
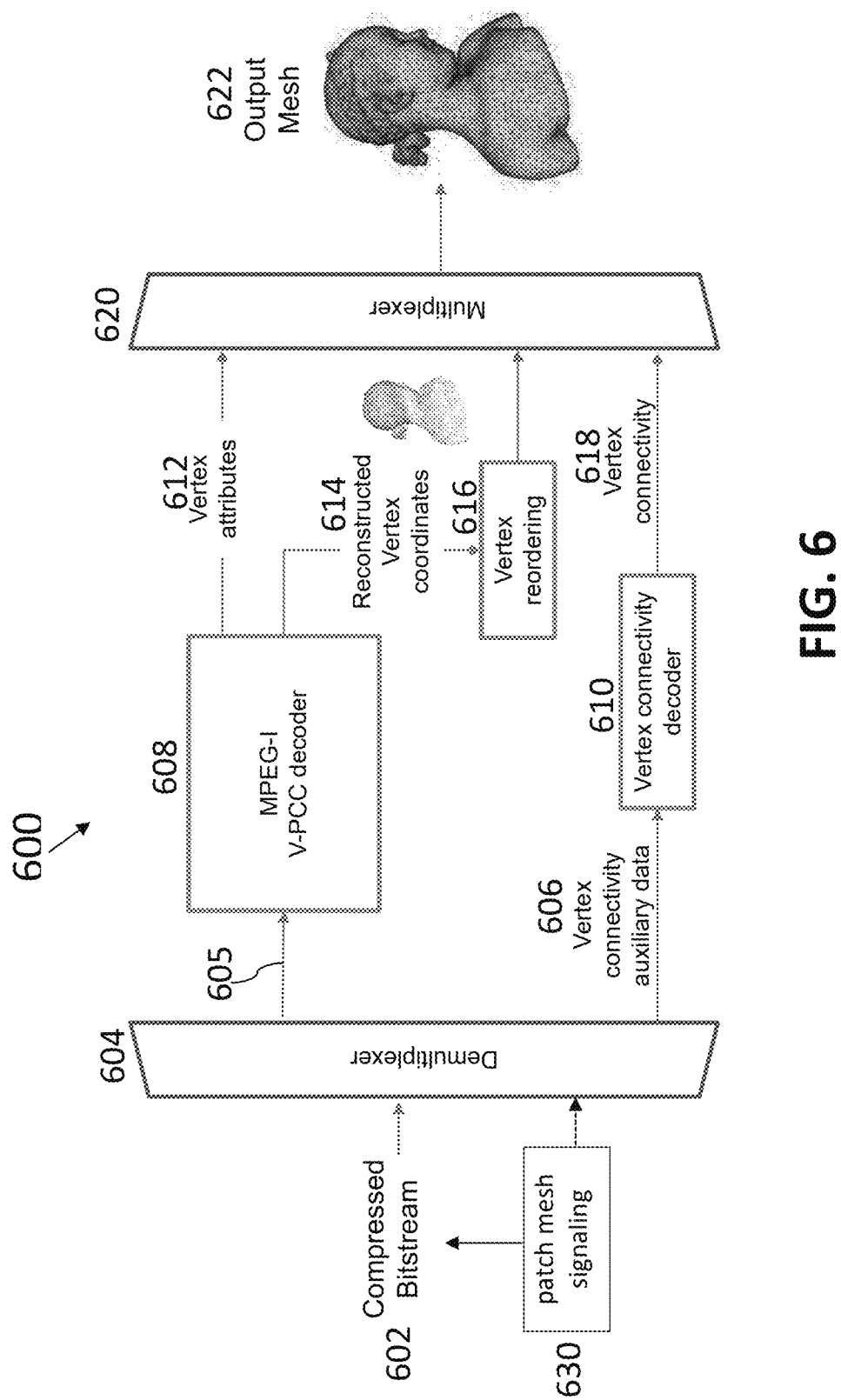
FIG. 6 shows an example V-PCC extension for mesh decoding, based on the embodiments described herein.

FIG. 5 and FIG. 6 show the extensions to the V-PCC encoder and decoder to support mesh encoding and mesh decoding, respectively, as proposed in MPEG input document [MPEG M47608].

In the encoder extension 500, the input mesh data 502 is demultiplexed with demultiplexer 504 into vertex coordinates+attributes 506 and vertex connectivity 508. The vertex coordinates+attributes data 506 is coded using MPEG-I V-PCC (such as with MPEG-I VPCC encoder 510), whereas the vertex connectivity data 508 is coded (using vertex connectivity encoder 516) as auxiliary data 518. Both of these (encoded vertex coordinates and vertex attributes 517 and auxiliary data 518) are multiplexed using multiplexer 520 to create the final compressed output bitstream 522. Vertex ordering 514 is carried out on the reconstructed vertex coordinates 512 at the output of MPEG-I V-PCC 510 to reorder the vertices for optimal vertex connectivity encoding 516.

Based on the examples described herein, as shown in FIG. 5, the encoding process/apparatus 500 of FIG. 5 may be extended such that the encoding process/apparatus 500 signals patch mesh signaling 530 (e.g. V3C patch mesh signaling) within the output bitstream 522. Alternatively, patch mesh signaling 530 may be provided and signaled separately from the output bitstream 522.

As shown in FIG. 6, in the decoder 600, the input bitstream 602 is demultiplexed with demultiplexer 604 to generate the compressed bitstreams for vertex coordinates+attributes 605 and vertex connectivity 606. The input/compressed bitstream 602 may comprise or may be the output from the encoder 500, namely the output bitstream 522 of FIG. 5. The vertex coordinates+attributes data 605 is decompressed using MPEG-I V-PCC decoder 608 to generate vertex attributes 612. Vertex ordering 616 is carried out on the reconstructed vertex coordinates 614 at the output of MPEG-I V-PCC decoder 608 to match the vertex order at the encoder 500. The vertex connectivity data 606 is also decompressed using vertex connectivity decoder 610 to generate vertex connectivity information 618, and everything (including vertex attributes 612, the output of vertex reordering 616, and vertex connectivity information 618) is multiplexed with multiplexer 620 to generate the reconstructed mesh 622.

Based on the examples described herein, as shown in FIG. 6, the decoding process/apparatus 600 of FIG. 6 may be extended such that the decoding process/apparatus 600 receives and decodes patch mesh signaling 630 (e.g. V3C patch mesh signaling), which may be part of the compressed bitstream 602. The patch mesh signaling 630 of FIG. 6 may comprise or correspond to the patch mesh signaling 530 of FIG. 5. Alternatively, patch mesh signaling 630 may be received and signaled separately from the compressed bitstream 602 or output bitstream 522 (e.g. signaled to the demultiplexer 604 separately from the compressed bitstream 602).

Generic Mesh Compression

Mesh data may be compressed directly without projecting it into 2D-planes, like in V-PCC based mesh coding. In fact, the anchor for V-PCC mesh compression call for proposals (CfP) utilizes off-the shelf mesh compression technology, Draco, for compressing mesh data excluding textures. Draco is used to compress vertex positions in 3D, connectivity data (faces) as well as UV coordinates. Additional per-vertex attributes may be also compressed using Draco. The actual UV texture may be compressed using traditional video compression technologies, such as H.265 or H.264.

Draco uses the edgebreaker algorithm at its core to compress 3D mesh information. Draco offers a good balance between simplicity and efficiency, and is part of Khronos endorsed extensions for the glTF specification. The main idea of the algorithm is to traverse mesh triangles in a deterministic way so that each new triangle is encoded next to an already encoded triangle. This enables prediction of vertex specific information from the previously encoded data by simply adding delta to the previous data. Edgebreaker utilizes symbols to signal how each new triangle is connected to the previously encoded part of the mesh. Connecting triangles in such a way results on average in 1 to 2 bits per triangle when combined with existing binary encoding techniques.

MPEG 3DG (ISO/IEC SC29 WG7) has issued a call for proposal (CfP) on integration of MESH compression into the V3C family of standards (ISO/IEC 23090-5). During the work on the CfP response of Applicant of the instant disclosure, Applicant has identified that transmitting mesh texture and geometry data in original (high) resolution requires very large bitrates. Downscaling of geometry and texture directly or by projection (in pixel values) produces various distortions of object geometry in 3D space and different artifacts in texture. Distortions in geometry produce artifacts in the 3D mesh (holes, broken surfaces, false faces). Distortions in texture produce visual artifacts in the texture of objects (banding, missing points, aliasing).

Further quantization of 3D geometry data using a 2D video encoder results in strong, non-linear artifacts in 3D objects. In addition, quantization of 3D object positions (geometry) before temporal compensation results in drift of object vertices.

Another issue is related to patch border encoding that gets distorted from lossy video encoding. This results in visible cracks or overlaps between patches. Increasing the quality of the encoding of patch borders in the geometry component atlases brings a large penalty in bitrate.

The aforementioned mesh extension of VPCC where connectivity is encoded alongside texture and geometry atlases does not solve the issue of generating large bitrates especially at low rate encoding points. The also aforementioned Draco mesh coding approach does not enable motion compensated compression of dynamic meshes.

In the method described herein, the dynamic mesh is first segmented into patches and the borders (or in other words contours) of these patches are extracted. A coarse mesh is generated from these contours and encoded using a near-lossless mesh coding approach such as Draco. Patch data is encoded into a V3C stream either independently from the coarse mesh, or differentially with respect to the coarse mesh.

This solution brings several advantages and technical effects. The method is inherently hierarchical as it provides a base layer (coarse mesh) and the V3C data as enhancement data. The method preserves much better patch borders as they are encoded near-losslessly. The method provides a viable solution for low rates. The method induces a small overhead for transmitting the full quality of the three-dimensional data.

Figures 7A, 7B:
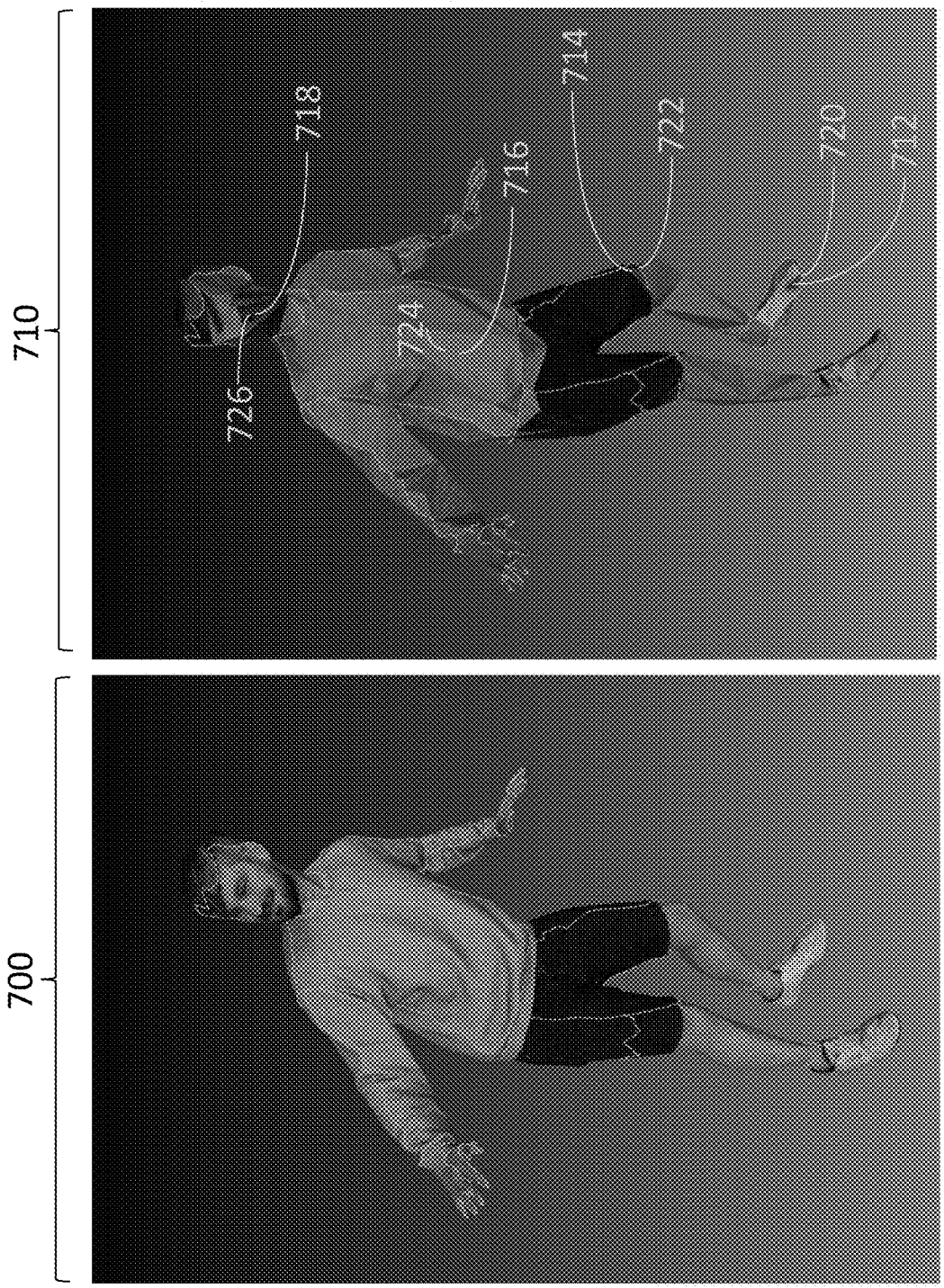
FIG. 7A shows an example of a mesh.
FIG. 7B shows an example of a simplified mesh, based on patch contours.

FIG. 7A shows an example of a mesh 700. FIG. 7B shows an example of a simplified mesh 710, based on patch contours.

In one embodiment the dynamic mesh is segmented frame by frame into patches. These patches can be built by clustering faces that share the feature that their normal direction maps to the same V3C projection plane.

Vertices of the patches are then classified as inner vertices and border vertices. Border vertices are such at least one of their connected neighbors belongs to another patch. Inner vertices are those vertices for which all neighbors belong to the same patch.

Border vertices can also include borders of the mesh, i.e. vertices that are located on the border of a mesh hole. The set of the border vertices of the segmented mesh is called the contours of the segmented mesh.

Figure 8B:
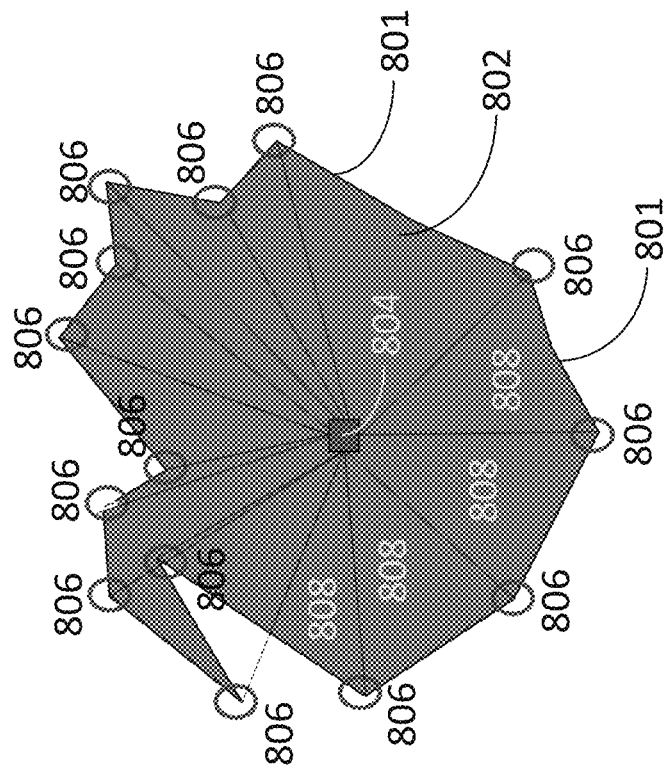
FIG. 8B shows a result of the triangulation using a triangle fan around the central point.
Figure 8A:
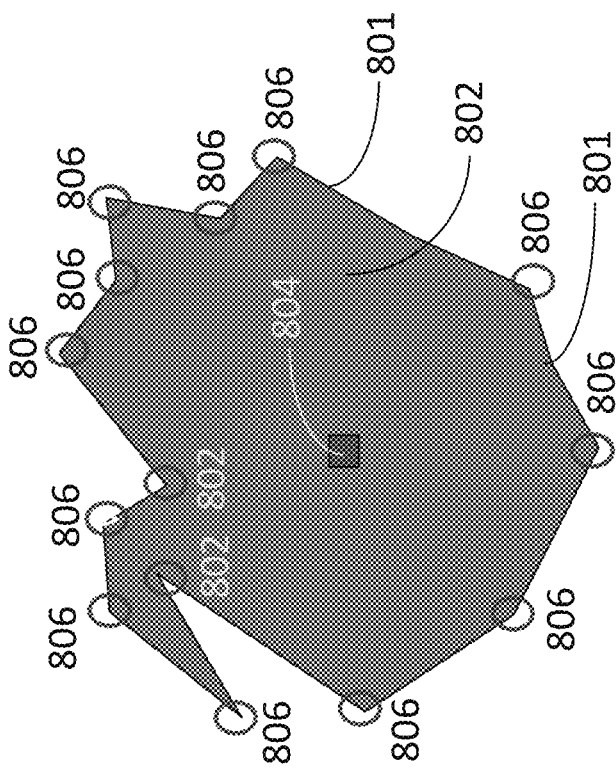
FIG. 8A shows a patch with its contour vertices highlighted and a central square as a virtual central point used to triangulate a contour mesh.

With reference to FIG. 8A and FIG. 8B, in one embodiment the generation of the 3D contour mesh is performed by removing all inner vertices of the mesh and keeping border vertices (e.g. 801, 806). Given this generates polylines and not a mesh, one vertex 804 is added per patch 802 that lies in the middle position of the patch 802. This middle position, or central point 804, can be the projection of the patch center of gravity on the patch 802 by using the V3C projection plane normal direction of the patch 802. Another approach can be done by estimating the geodesic center of gravity of the patch 802. This consists of computing the geodesic distance between all vertices (e.g. 801, 806) of the patch, for example using the Dijkstra algorithm, and select the vertex 804 for which the sum of the geodesic distances to all other vertices (e.g. 801, 806) of the patch 802 is the minimum. Once this point 804 is added, the patch contour is triangulated by connecting each contour point 806 to this central point 804 as illustrated on FIG. 8B, where the triangulation includes triangles 808, among other triangles as shown in FIG. 8B. The patch 802 is therefore represented as a triangle fan around the central point 804 (that can be seen as a virtual point) and which covers all contour points 806. This process is performed for all patches and the 3D contour mesh is encoded using a near-lossless encoder such as Edge-Breaker. The central point 804 of each patch can also contain an attribute with the patch_idx (patch index) it belongs to.

Accordingly, FIG. 8A shows a patch 802 with its contour vertices 806 highlighted with circles. The central square 804 illustrates the virtual central point used to triangulate the contour mesh. FIG. 8B shows the result of the triangulation using a triangle fan (comprising triangles 808 and other triangles shown in FIG. 8B) around the central point 804.

Figure 9:
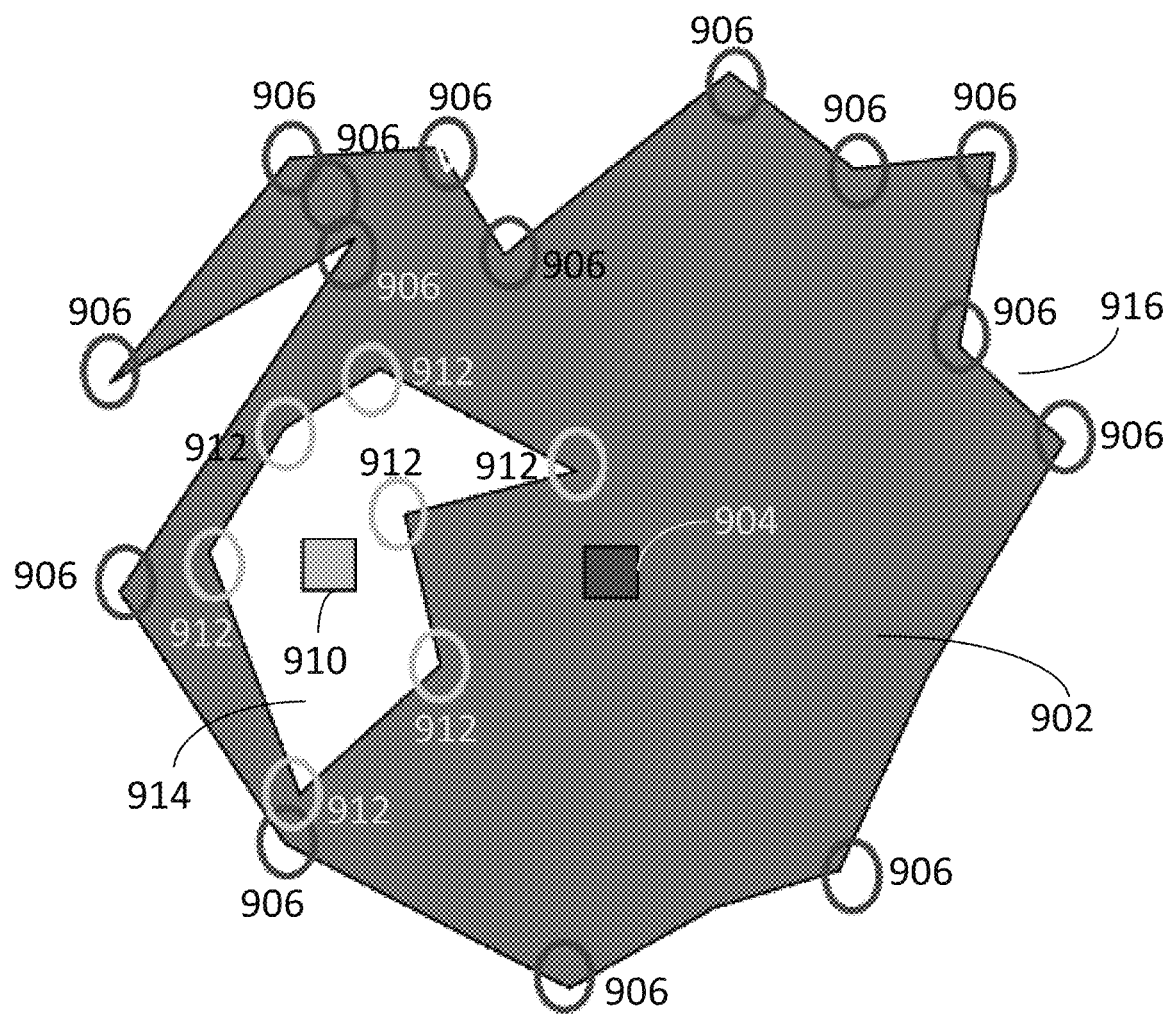
FIG. 9 shows a patch having external contours and an inner contour.

The handling of patches 902 that have internal contours 912 as illustrated on FIG. 9, is done by triangulating the inner contours 912 and external contours 906 independently. If the central point 904 is not inside the inner contour 914 a second central point 910 is added for the inner contour 914. On top of patch index information the central points (904, 910) also convey whether they are related to an external 916 or internal contour 914. If there are more than one inner contour, then a central point is provided for each of them and each of them is triangulated with a triangle fan around its respective central point.

These internal contours 912 need to be signaled, for example with vertex metadata in the encoded contour mesh. This is important for the decoder that needs to avoid reconstructing the surface inside internal contours for that patch, as the internal contour may be the external contour of another patch for which a higher quality prediction and reconstruction can be performed. The metadata may be associated to the central vertices and contour vertices of the contour mesh. This metadata can be encoded as multiple attribute data for the vertices, with the list of patch indices it belongs to and an additional sign that specifies if it corresponds to an internal or external contour, and whether it is a central vertex or not. The decoder when processing the contour meshes only processes external contours. The decoder uses internal contours of a V3C patch, to discard from the reconstruction process the pixels that are located inside the projection of the internal contour on the V3C patch projection plane.

Accordingly, FIG. 9 shows external contours 906 of a patch 902 that also contains an inner contour 914. Shown are the vertices 912 of the inner contour 914. Further shown in FIG. 9 is the central point 904 for the external contour (916, set of 906) and the central point 910 for the inner contour 914. Each contour (inner 914 and external (916, set of 906)) is encoded with a triangle fan around its central point (904, 910). A central point is added per inner contour in the patch 902.

In another embodiment, a mesh simplification algorithm is used to decimate the segmented mesh with the constraint that all contour vertices are required to be preserved. This generates small triangles (e.g. 712 and 714) around the contours and large triangles (e.g. 716 and 718) that cover the inner vertices of the patch as illustrated on FIG. 7B. This approach has the advantage of providing a higher quality coarse mesh 710 than the removal of all inner vertices, but it requires to signal which vertices (e.g. 720, 722) belong to the contour and which ones are virtual points (e.g. 724, 726). This process is performed for all patches and the 3D contour mesh 710 is encoded using a near-lossless encoder such as Edge-Breaker. The virtual points (e.g. 724, 726) of each patch can also contain an attribute with the patch_idx (patch index) they belong to for enabling an easy registration of patches and the 3D contour mesh 710 at the decoder-side (e.g. 600, 1000).

The encoding of the geometry component of the patches and texture component of the patches is performed in one embodiment by encoding the full patch geometry and texture components in padded atlases. This enables to realign better the decoded patches and the contour mesh at the decoder side (e.g. 600, 1000) but this means contour vertices are encoded twice.

In another embodiment the contour vertices are removed and only the inner vertices of the geometry and texture components are encoded in padded atlases. In this case there is less redundancy, so higher compression gains, and the decoder (e.g. 600, 1000) is required to map inner vertices to the 3D contour mesh.

In addition, all inner geometry values could be encoded as a residual between an original geometry and a prediction surface formed by contour patches. Such prediction can be a simple triangulation of the contour or for example based on solving the minimal surface spanned by the contour. Finding such minimal surface requires solving the equation $$(1 + u_x^2)u_{yy} - 2u_xu_yu_{xy} + (1 + u_y^2)u_{xx} = 0 \quad \text{(Equation 1)}$$

by projecting the contour on the projection plane of the corresponding patch. Such equation can be solved with standard numerical approaches such as gradient descent. The process is performed for each frame of the dynamic mesh. The transmission of the mesh is therefore a multiplexing of a 3D contour mesh and a V3C bitstream.

In one embodiment at the decoder side, the 3D contour mesh and V3C bitstream are demultiplexed, and for each frame: i) the 3D contour mesh is decoded, central points and triangles are removed, and only contour points are kept with the list of patches they belong to; ii) all V3C patches are reconstructed and remeshed; iii) the 3D points of the 3D contour mesh are used to paste patches together as follows: for each patch pixel at the boundary of the decoded patch, its position is fused with the closest 3D contour mesh 3D point.

In another embodiment at the decoder side, the 3D contour mesh and V3C bitstream are demultiplexed, and for each frame: i) the 3D contour mesh is decoded, and a prediction of the patch surface is performed as signaled by the V3C bitstream; ii) all V3C patches are decoded using the predicted surface computed on the 3D contour mesh, and the patches are remeshed; iii) the 3D points of the 3D contour mesh are used to paste patches together as follows: for each patch pixel at the boundary of the decoded patch, its position is fused with the closest 3D contour mesh 3D point.

Signaling required includes signaling a flag in the V3C bitstream that there is a muxed 3D contour mesh, signaling a flag in the v3C bitstream if and which type of predictive function is used for predictive encoding, signaling a flag that delta values are encoded for geometry, and signaling a flag that 3D contour points are used to paste patch borders.

The idea described herein or part of the idea described herein is to be part of the response of Applicant of the instant disclosure to the mesh coding CfP and is to be contributed to standardization in SC29/WG7.

V3C streams with the feature described herein are to have additional signaling values. Once the features described herein are enabled, GEO and TEX data are to be represented in a different form (like FIG. 7A, FIG. 7B, FIG. 8A, FIG. 8B, and FIG. 9).

Figure 10:
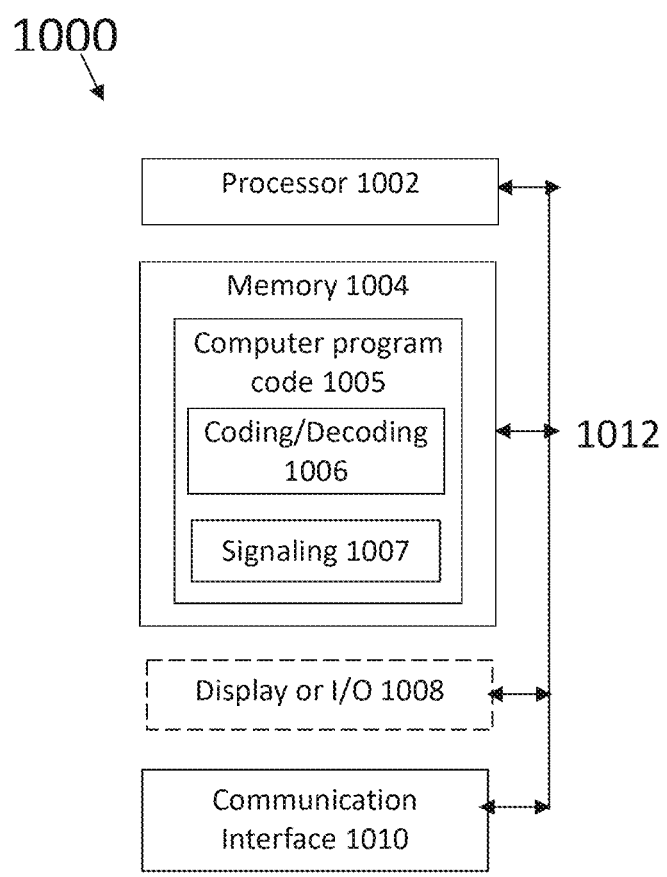
FIG. 10 is an example apparatus to implement compression of mesh geometry based on 3D patch contours, based on the examples described herein.

FIG. 10 is an apparatus 1000 which may be implemented in hardware, configured to implement compression of mesh geometry based on 3D patch contours, based on any of the examples described herein. The apparatus comprises a processor 1002, at least one memory 1004 (memory 1004 may be non-transitory, transitory, non-volatile, or volatile) including computer program code 1005, wherein the at least one memory 1004 and the computer program code 1005 are configured to, with the at least one processor 1002, cause the apparatus to implement circuitry, a process, component, module, function, coding, and/or decoding (collectively 1006) to implement compression of mesh geometry based on 3D patch contours, based on the examples described herein. The apparatus 1000 is further configured to provide or receive signaling 1007, based on the signaling embodiments described herein. The apparatus 1000 optionally includes a display and/or I/O interface 1008 that may be used to display an output (e.g., an image or volumetric video) of a result of coding/decoding 1006. The display and/or I/O interface 1008 may also be configured to receive input such as user input (e.g. with a keypad, touchscreen, touch area, microphone, biometric recognition etc.). The apparatus 1000 also includes one or more communication interfaces (I/F(s)) 1010, such as a network (NW) interface. The communication I/F(s) 1010 may be wired and/or wireless and facilitate communication over a channel or the Internet/other network(s) via any communication technique. The communication I/F(s) 1010 may comprise one or more transmitters and one or more receivers. The communication I/F(s) 1010 may comprise standard well-known components such as an amplifier, filter, frequency-converter, (de)modulator, and encoder/decoder circuitry(ies) and one or more antennas. In some examples, the processor 1002 is configured to implement item 1006 and/or item 1007 without use of memory 1004.

The apparatus 1000 may be a remote, virtual or cloud apparatus. The apparatus 1000 may be either a writer or a reader (e.g. parser), or both a writer and a reader (e.g. parser). The apparatus 1000 may be either a coder or a decoder, or both a coder and a decoder (codec). The apparatus 1000 may be a user equipment (UE), a head mounted display (HMD), or any other fixed or mobile device.

The memory 1004 may be implemented using any suitable data storage technology, such as semiconductor based memory devices, flash memory, magnetic memory devices and systems, optical memory devices and systems, fixed memory and removable memory. The memory 1004 may comprise a database for storing data. Interface 1012 enables data communication between the various items of apparatus 1000, as shown in FIG. 10. Interface 1012 may be one or more buses. For example, the interface 1012 may be one or more buses such as address, data, or control buses, and may include any interconnection mechanism, such as a series of lines on a motherboard or integrated circuit, fiber optics or other optical communication equipment, and the like. Interface 1012 may be one or more software interfaces configured to pass data within computer program code 1005. For example, interface 1012 may comprises an object-oriented software interface. The apparatus 1000 need not comprise each of the features mentioned, or may comprise other features as well. The apparatus 1000 may be an embodiment of and have the features of any of the apparatuses shown in FIG. 1A, FIG. 1B, FIG. 5, and/or FIG. 6.

Figure 11:
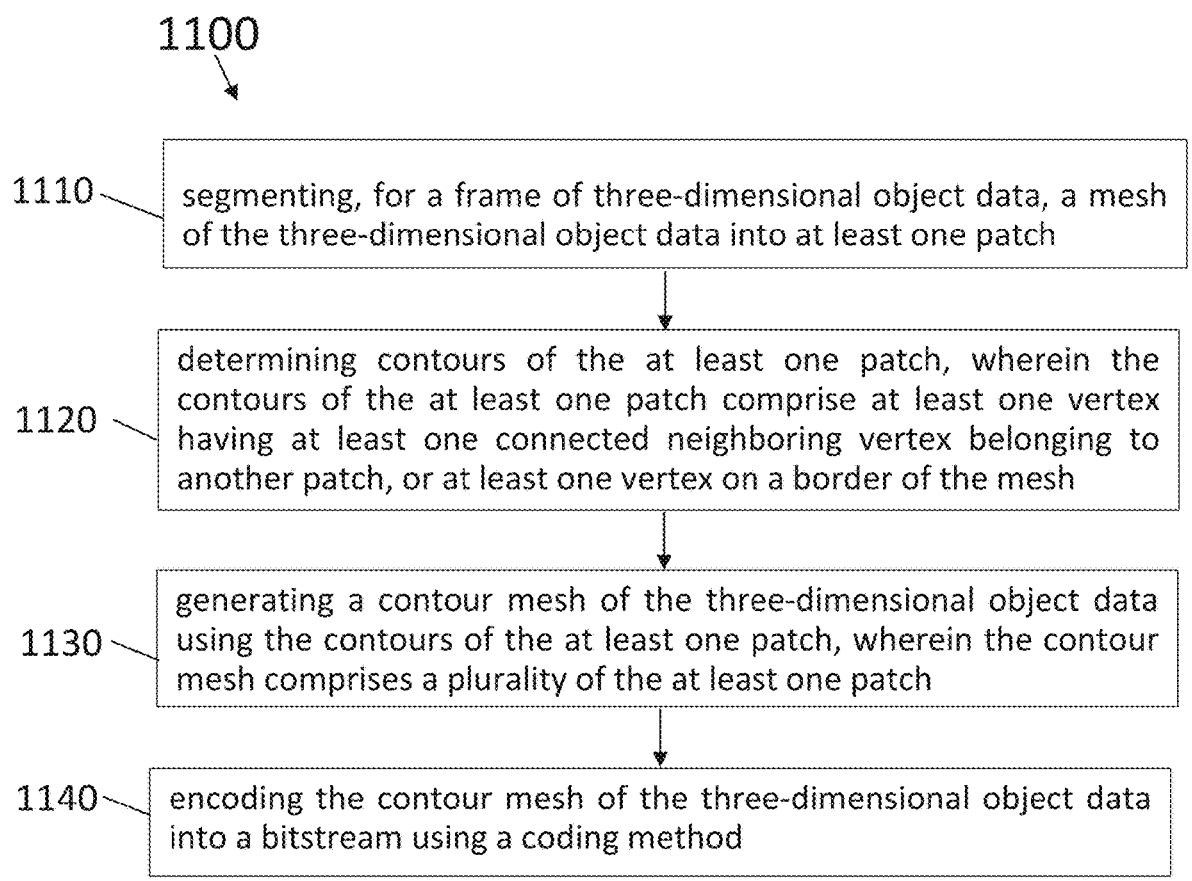
FIG. 11 is an example method to implement compression of mesh geometry based on 3D patch contours, based on the examples described herein.

FIG. 11 is a method 1100 to implement compression of mesh geometry based on 3D patch contours, based on the examples described herein. At 1110, the method includes segmenting, for a frame of three-dimensional object data, a mesh of the three-dimensional object data into at least one patch. At 1120, the method includes determining contours of the at least one patch, wherein the contours of the at least one patch comprise at least one vertex having at least one connected neighboring vertex belonging to another patch, or at least one vertex on a border of the mesh. At 1130, the method includes generating a contour mesh of the three-dimensional object data using the contours of the at least one patch, wherein the contour mesh comprises a plurality of the at least one patch. At 1140, the method includes encoding the contour mesh of the three-dimensional object data into a bitstream using a coding method. Method 1100 may be performed with apparatus 500 or apparatus 1000.

Figure 12:
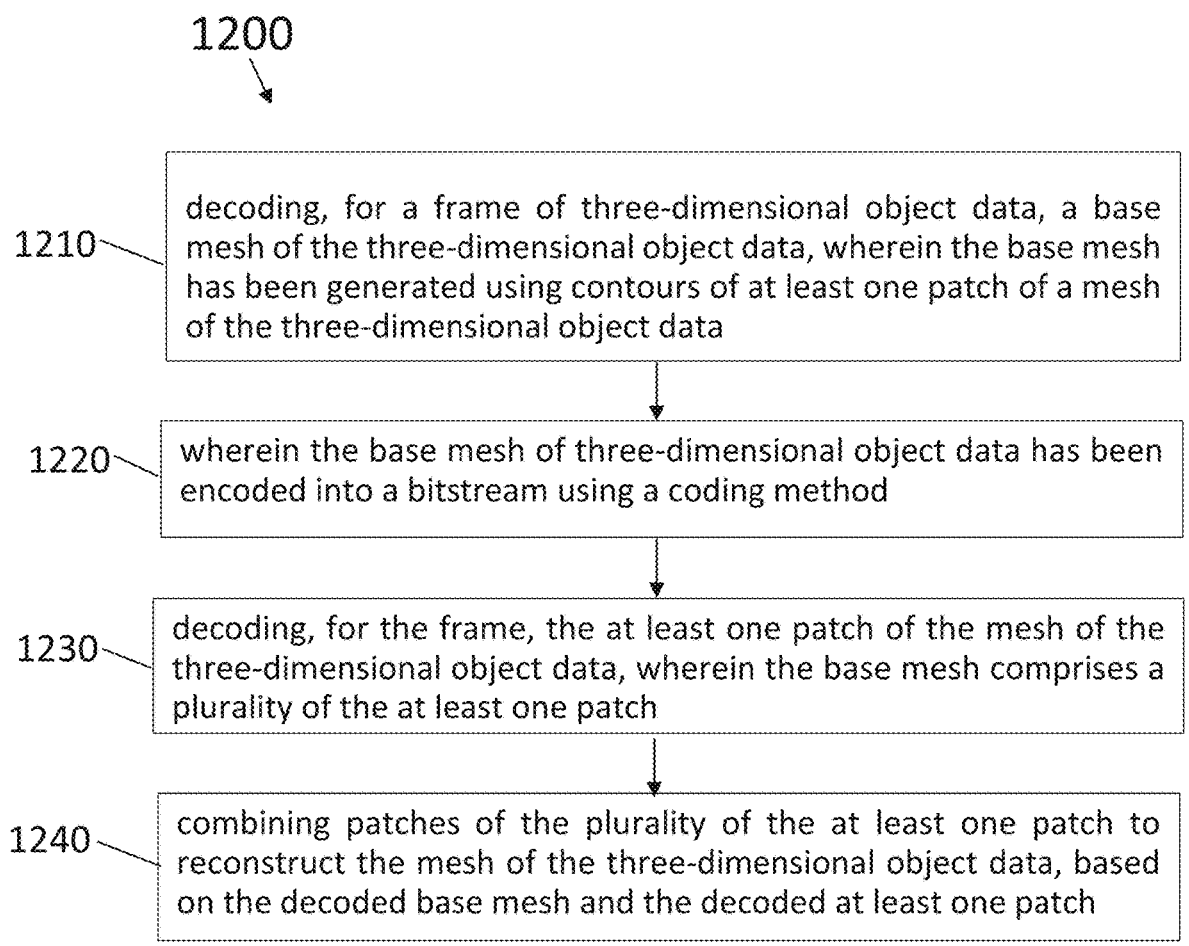
FIG. 12 is example method to implement compression of mesh geometry based on 3D patch contours, based on the examples described herein.

FIG. 12 is a method 1200 to implement compression of mesh geometry based on 3D patch contours, based on the examples described herein. At 1210, the method includes decoding, for a frame of three-dimensional object data, a base mesh of the three-dimensional object data, wherein the base mesh has been generated using contours of at least one patch of a mesh of the three-dimensional object data. At 1220, the method includes wherein the base mesh of three-dimensional object data has been encoded into a bitstream using a coding method. At 1230, the method includes decoding, for the frame, the at least one patch of the mesh of the three-dimensional object data, wherein the base mesh comprises a plurality of the at least one patch. At 1240, the method includes combining patches of the plurality of the at least one patch to reconstruct the mesh of the three-dimensional object data, based on the decoded base mesh and the decoded at least one patch. Method 1200 may be performed with apparatus 600 or with apparatus 1000.

Figure 13:
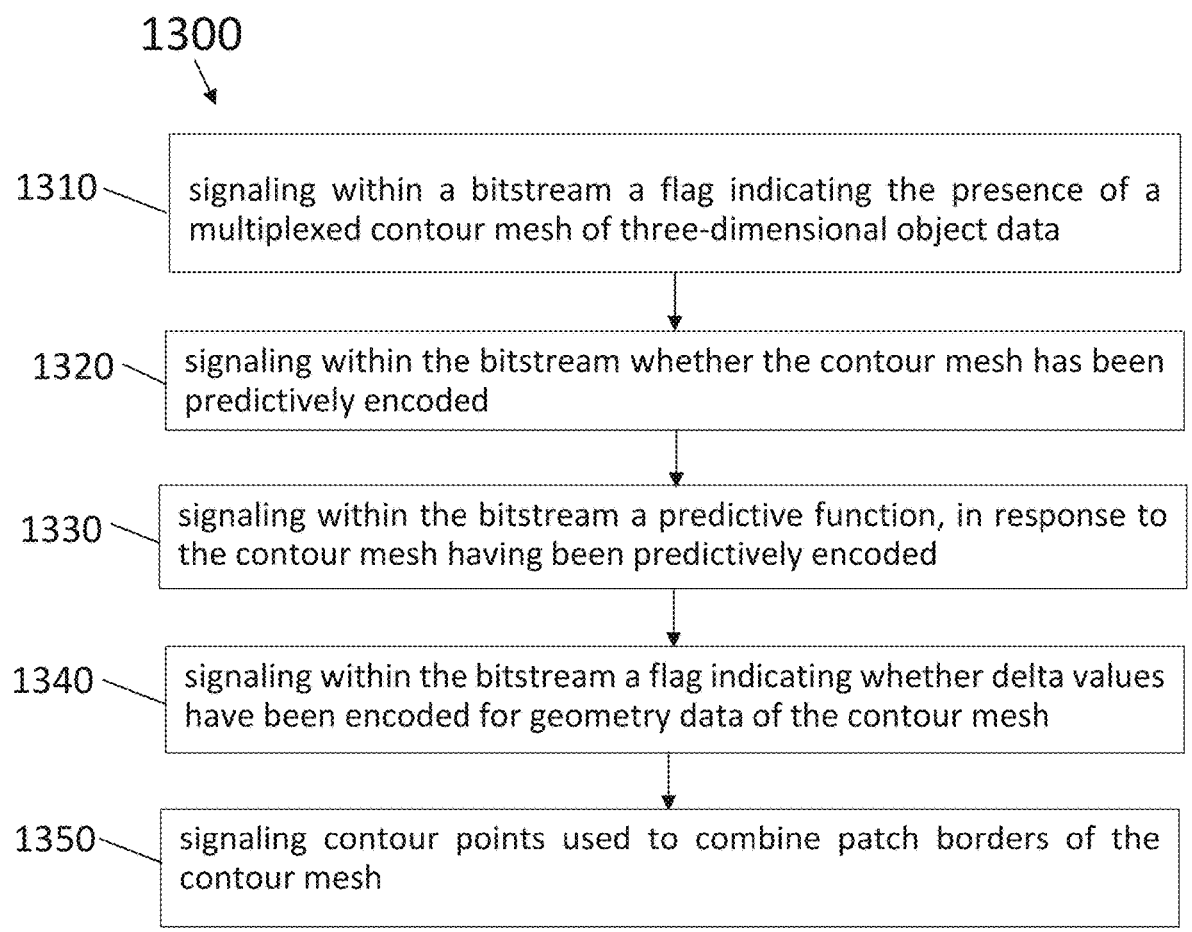
FIG. 13 is example method to implement compression of mesh geometry based on 3D patch contours, based on the examples described herein.

FIG. 13 is a method 1300 to implement compression of mesh geometry based on 3D patch contours, based on the examples described herein. At 1310, the method includes signaling within a bitstream a flag indicating the presence of a multiplexed contour mesh of three-dimensional object data. At 1320, the method includes signaling within the bitstream whether the contour mesh has been predictively encoded. At 1330, the method includes signaling within the bitstream a predictive function, in response to the contour mesh having been predictively encoded. At 1340, the method includes signaling within the bitstream a flag indicating whether delta values have been encoded for geometry data of the contour mesh. At 1350, the method includes signaling contour points used to combine patch borders of the contour mesh. Method 1300 may be performed with apparatus 500 or apparatus 1000.

The following examples 1-29 are described herein.

Example 1: An apparatus includes at least one processor; and at least one memory including computer program code; wherein the at least one memory and the computer program code are configured to, with the at least one processor, cause the apparatus at least to: segment, for a frame of three-dimensional object data, a mesh of the three-dimensional object data into at least one patch; determine contours of the at least one patch, wherein the contours of the at least one patch comprise at least one vertex having at least one connected neighboring vertex belonging to another patch, or at least one vertex on a border of the mesh; generate a contour mesh of the three-dimensional object data using the contours of the at least one patch, wherein the contour mesh comprises a plurality of the at least one patch; and encode the contour mesh of the three-dimensional object data into a bitstream using a near-lossless coding method, wherein the near-lossless coding method limits an error for at least one pixel of the at least one patch to a given specified value.

Example 2: The apparatus of example 1, wherein the at least one memory and the computer program code are further configured to, with the at least one processor, cause the apparatus at least to: generate the at least one patch with clustering faces sharing a common feature a normal direction of the faces maps to a common projection plane.

Example 3: The apparatus of any of examples 1 to 2, wherein the contour mesh of the three-dimensional object data is generated as a result of removing inner vertices of the mesh and keeping border vertices.

Example 4: The apparatus of any of examples 1 to 3, wherein the at least one memory and the computer program code are further configured to, with the at least one processor, cause the apparatus at least to: determine a virtual point within a middle position of the at least one patch.

Example 5: The apparatus of example 4, wherein: the virtual point is determined as a projection of a center of gravity of the at least one patch using a visual volumetric video-based coding projection plane normal direction of the at least one patch; or the virtual point is determined as a geodesic center of gravity of the at least one patch.

Example 6: The apparatus of any of examples 4 to 5, wherein the at least one memory and the computer program code are further configured to, with the at least one processor, cause the apparatus at least to: triangulate the at least one patch with connecting the contours of the at least one patch to the virtual point, to represent the at least one patch as a triangle fan around the virtual point.

Example 7: The apparatus of any of examples 4 to 6, wherein: the virtual point comprises a first attribute with a patch index of the at least one patch the virtual point belongs to; and the virtual point comprises a second attribute indicating whether the virtual point is related to an external contour of the at least one patch or an inner contour of the at least one patch.

Example 8: The apparatus of any of examples 1 to 7, wherein the at least one memory and the computer program code are further configured to, with the at least one processor, cause the apparatus at least to: determine a virtual point within a middle position of an inner contour of the at least one patch; and triangulate the inner contour of at least one patch with connecting contours of inner contour of the at least one patch to the virtual point, to represent the inner contour of the at least one patch as a triangle fan around the virtual point.

Example 9: The apparatus of any of examples 1 to 8, wherein the at least one memory and the computer program code are further configured to, with the at least one processor, cause the apparatus at least to: decimate the segmented mesh so that contour vertices of the mesh of the three-dimensional object data are preserved while generating the contour mesh, to generate triangles around the contours and triangles covering inner vertices of the at least one patch.

Example 10: The apparatus of examples 9, wherein the at least one memory and the computer program code are further configured to, with the at least one processor, cause the apparatus at least to: signal the contours of the at least one patch; and signal virtual points of the plurality of the at least one patch.

Example 11: The apparatus of any of examples 1 to 10, wherein the at least one memory and the computer program code are further configured to, with the at least one processor, cause the apparatus at least to: encode a geometry component and a texture component of the at least one patch within at least one padded atlas, wherein the geometry component and the texture component comprise contour vertices and inner vertices; or encode a geometry component and a texture component of the at least one patch within at least one padded atlas, wherein the geometry component and the texture component comprise inner vertices without contour vertices.

Example 12: The apparatus of any of examples 1 to 11, wherein the at least one memory and the computer program code are further configured to, with the at least one processor, cause the apparatus at least to: encode inner geometry values as a residual between an original geometry surface and a prediction surface formed with contour patches; wherein the prediction surface is formed based on a triangulation of a contour, or based on a minimal surface spanned with the contour following projecting the contour on a projection plane of the at least one patch.

Example 13: The apparatus of any of examples 1 to 12, wherein the at least one memory and the computer program code are further configured to, with the at least one processor, cause the apparatus at least to: transmit the contour mesh to a decoder as a multiplexing of the contour mesh and a visual volumetric video-based coding bitstream.

Example 14: An apparatus includes at least one processor; and at least one memory including computer program code; wherein the at least one memory and the computer program code are configured to, with the at least one processor, cause the apparatus at least to: decode, for a frame of three-dimensional object data, a base mesh of the three-dimensional object data, wherein the base mesh has been generated using contours of at least one patch of a mesh of the three-dimensional object data; wherein the base mesh of three-dimensional object data has been encoded into a bitstream using a near-lossless coding method, wherein the near-lossless coding method limits an error for at least one pixel of the at least one patch to a given specified value; decode, for the frame, the at least one patch of the mesh of the three-dimensional object data, wherein the base mesh comprises a plurality of the at least one patch; and combine patches of the plurality of the at least one patch to reconstruct the mesh of the three-dimensional object data, based on the decoded base mesh and the decoded at least one patch.

Example 15: The apparatus of example 14, wherein the at least one memory and the computer program code are further configured to, with the at least one processor, cause the apparatus at least to: remove central points and triangles from the base mesh; and keep contours of the mesh, and for a contour, keep a list of patches the contour belongs to.

Example 16: The apparatus of any of examples 14 to 15, wherein the at least one memory and the computer program code are further configured to, with the at least one processor, cause the apparatus at least to: predict a surface of the at least one patch based on received signaling; wherein the at least one patch of the three-dimensional object data is decoded using the predicted surface.

Example 17: The apparatus of any of examples 14 to 16, wherein patches of the plurality of the at least one patch are combined with fusing a position of a patch pixel at a boundary of the decoded patch with a closest three-dimensional point of the base mesh.

Example 18: The apparatus of any of examples 14 to 17, wherein the at least one memory and the computer program code are further configured to, with the at least one processor, cause the apparatus at least to: demultiplex the base mesh of the three-dimensional object data and a visual volumetric video-based coding bitstream.

Example 19: An apparatus comprising: at least one processor; and at least one memory including computer program code; wherein the at least one memory and the computer program code are configured to, with the at least one processor, cause the apparatus at least to: signal within a bitstream a flag indicating the presence of a multiplexed contour mesh of three-dimensional object data; signal within the bitstream whether the contour mesh has been predictively encoded; signal within the bitstream a predictive function, in response to the contour mesh having been predictively encoded; signal within the bitstream a flag indicating whether delta values have been encoded for geometry data of the contour mesh; and signal contour points used to combine patch borders of the contour mesh.

Example 20: The apparatus of example 19, wherein the bitstream comprises a visual volumetric video-based coding bitstream.

Example 21: A method includes segmenting, for a frame of three-dimensional object data, a mesh of the three-dimensional object data into at least one patch; determining contours of the at least one patch, wherein the contours of the at least one patch comprise at least one vertex having at least one connected neighboring vertex belonging to another patch, or at least one vertex on a border of the mesh; generating a contour mesh of the three-dimensional object data using the contours of the at least one patch, wherein the contour mesh comprises a plurality of the at least one patch; and encoding the contour mesh of the three-dimensional object data into a bitstream using a near-lossless coding method, wherein the near-lossless coding method limits an error for at least one pixel of the at least one patch to a given specified value.

Example 22: A method includes decoding, for a frame of three-dimensional object data, a base mesh of the three-dimensional object data, wherein the base mesh has been generated using contours of at least one patch of a mesh of the three-dimensional object data; wherein the base mesh of three-dimensional object data has been encoded into a bitstream using a near-lossless coding method, wherein the near-lossless coding method limits an error for at least one pixel of the at least one patch to a given specified value; decoding, for the frame, the at least one patch of the mesh of the three-dimensional object data, wherein the base mesh comprises a plurality of the at least one patch; and combining patches of the plurality of the at least one patch to reconstruct the mesh of the three-dimensional object data, based on the decoded base mesh and the decoded at least one patch.

Example 23: A method includes signaling within a bitstream a flag indicating the presence of a multiplexed contour mesh of three-dimensional object data; signaling within the bitstream whether the contour mesh has been predictively encoded; signaling within the bitstream a predictive function, in response to the contour mesh having been predictively encoded; signaling within the bitstream a flag indicating whether delta values have been encoded for geometry data of the contour mesh; and signaling contour points used to combine patch borders of the contour mesh.

Example 24: An apparatus includes means for segmenting, for a frame of three-dimensional object data, a mesh of the three-dimensional object data into at least one patch; means for determining contours of the at least one patch, wherein the contours of the at least one patch comprise at least one vertex having at least one connected neighboring vertex belonging to another patch, or at least one vertex on a border of the mesh; means for generating a contour mesh of the three-dimensional object data using the contours of the at least one patch, wherein the contour mesh comprises a plurality of the at least one patch; and means for encoding the contour mesh of the three-dimensional object data into a bitstream using a near-lossless coding method, wherein the near-lossless coding method limits an error for at least one pixel of the at least one patch to a given specified value.

Example 25: An apparatus includes means for decoding, for a frame of three-dimensional object data, a base mesh of the three-dimensional object data, wherein the base mesh has been generated using contours of at least one patch of a mesh of the three-dimensional object data; wherein the base mesh of three-dimensional object data has been encoded into a bitstream using a near-lossless coding method, wherein the near-lossless coding method limits an error for at least one pixel of the at least one patch to a given specified value; means for decoding, for the frame, the at least one patch of the mesh of the three-dimensional object data, wherein the base mesh comprises a plurality of the at least one patch; and means for combining patches of the plurality of the at least one patch to reconstruct the mesh of the three-dimensional object data, based on the decoded base mesh and the decoded at least one patch.

Example 26: An apparatus includes means for signaling within a bitstream a flag indicating the presence of a multiplexed contour mesh of three-dimensional object data; means for signaling within the bitstream whether the contour mesh has been predictively encoded; means for signaling within the bitstream a predictive function, in response to the contour mesh having been predictively encoded; means for signaling within the bitstream a flag indicating whether delta values have been encoded for geometry data of the contour mesh; and means for signaling contour points used to combine patch borders of the contour mesh.

Example 27: A non-transitory program storage device readable by a machine, tangibly embodying a program of instructions executable with the machine for performing operations is described and provided, the operations comprising: segmenting, for a frame of three-dimensional object data, a mesh of the three-dimensional object data into at least one patch; determining contours of the at least one patch, wherein the contours of the at least one patch comprise at least one vertex having at least one connected neighboring vertex belonging to another patch, or at least one vertex on a border of the mesh; generating a contour mesh of the three-dimensional object data using the contours of the at least one patch, wherein the contour mesh comprises a plurality of the at least one patch; and encoding the contour mesh of the three-dimensional object data into a bitstream using a near-lossless coding method, wherein the near-lossless coding method limits an error for at least one pixel of the at least one patch to a given specified value.

Example 28: A non-transitory program storage device readable by a machine, tangibly embodying a program of instructions executable with the machine for performing operations is described and provided, the operations comprising: decoding, for a frame of three-dimensional object data, a base mesh of the three-dimensional object data, wherein the base mesh has been generated using contours of at least one patch of a mesh of the three-dimensional object data; wherein the base mesh of three-dimensional object data has been encoded into a bitstream using a near-lossless coding method, wherein the near-lossless coding method limits an error for at least one pixel of the at least one patch to a given specified value; decoding, for the frame, the at least one patch of the mesh of the three-dimensional object data, wherein the base mesh comprises a plurality of the at least one patch; and combining patches of the plurality of the at least one patch to reconstruct the mesh of the three-dimensional object data, based on the decoded base mesh and the decoded at least one patch.

Example 29: A non-transitory program storage device readable by a machine, tangibly embodying a program of instructions executable with the machine for performing operations is described and provided, the operations comprising: signaling within a bitstream a flag indicating the presence of a multiplexed contour mesh of three-dimensional object data; signaling within the bitstream whether the contour mesh has been predictively encoded; signaling within the bitstream a predictive function, in response to the contour mesh having been predictively encoded; signaling within the bitstream a flag indicating whether delta values have been encoded for geometry data of the contour mesh; and signaling contour points used to combine patch borders of the contour mesh.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

In the figures, arrows between individual blocks represent operational couplings there-between as well as the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

2D or 2d two-dimensional
3D or 3d three-dimensional
3DG 3D graphics coding group
6DOF six degrees of freedom
ACL atlas coding layer
AR augmented reality
ASIC application-specific integrated circuit
asps atlas sequence parameter set
CfP call for proposal(s)
CGI computer-generated imagery
FDIS final draft international standard
GEO geometry data of mesh
glTF graphics language transmission format
H.264 advanced video coding video compression standard
H.265 high efficiency video coding video compression standard
HMD head mounted display
id identifier
Idx index
IEC International Electrotechnical Commission
I/F interface
I/O input/output
ISO International Organization for Standardization
miv or MIV MPEG immersive video
MPEG moving picture experts group
MPEG-I MPEG immersive
MR mixed reality
NAL or nal network abstraction layer
NW network
RBSP raw byte sequence payload
SC subcommittee
TEX texture data of mesh
u(n) unsigned integer using n bits, e.g. u(1), u(2)
UE user equipment
ue(v) unsigned integer exponential Golomb coded syntax element with the left bit first
UV coordinate texture, where "U" and "V" are axes of a 2D texture
V3C visual volumetric video-based coding
VPCC or V-PCC video-based point cloud coding/compression
VPS V3C parameter set
VR virtual reality
WG working group

What is claimed is:

1. An apparatus comprising:
at least one processor; and
at least one memory storing instructions that, when executed by the at least one processor, cause the apparatus at least to:
segment, for a frame of three-dimensional object data, a mesh of the three-dimensional object data into at least one patch;

determine contours of the at least one patch, wherein the contours of the at least one patch comprise at least one vertex having at least one connected neighboring vertex belonging to another patch, or at least one vertex on a border of the mesh;

generate a contour mesh of the three-dimensional object data using the contours of the at least one patch, wherein the contour mesh comprises a plurality of the at least one patch;

encode the contour mesh of the three-dimensional object data into a bitstream using a coding method;

wherein the contour mesh of the three-dimensional object data is generated as a result of removing all inner vertices of the mesh of the three-dimensional object data and keeping border vertices, and adding a central point as a virtual point to the at least one patch of the contour mesh that connects to the contours of the at least one patch of the contour mesh;

signal a first attribute of the virtual point that is at a center of the at least one patch of the contour mesh, wherein the first attribute of the virtual point that is at the center of the at least one patch of the contour mesh that is signaled comprises a patch index that indicates the at least one patch the virtual point belongs to; and signal a second attribute of the virtual point that is at the center of the at least one patch of the contour mesh, wherein the second attribute of the virtual point that is at the center of the at least one patch of the contour mesh that is signaled comprises an indication of whether the virtual point is related to an external contour of the at least one patch or an inner contour of the at least one patch.

2. The apparatus of claim 1, wherein the at least one memory stores instructions that, when executed by the at least one processor, cause the apparatus at least to:
generate the at least one patch with clustering faces sharing a common feature at a normal direction of the faces that maps to a common projection plane.

3. The apparatus of claim 1, wherein the at least one memory stores instructions that, when executed by the at least one processor, cause the apparatus at least to:
signal inner contours of the at least one patch of the contour mesh to indicate to a decoder to not reconstruct a surface inside the inner contours of the at least one patch, wherein the contours of the at least one patch of the contour mesh comprise external contours of the at least one patch of the contour mesh and the inner contours of the at least one patch of the contour mesh.

4. The apparatus of claim 1, wherein the at least one memory stores instructions that, when executed by the at least one processor, cause the apparatus at least to:
determine the virtual point to be within a middle position of the at least one patch.

5. The apparatus of claim 1, wherein:
the virtual point is determined as a projection of a center of gravity of the at least one patch using a visual volumetric video-based coding projection plane normal direction of the at least one patch, or
the virtual point is determined as a geodesic center of gravity of the at least one patch.

6. The apparatus of claim 1, wherein the at least one memory stores instructions that, when executed by the at least one processor, cause the apparatus at least to:
triangulate the at least one patch with connecting the contours of the at least one patch to the virtual point, to represent the at least one patch as a triangle fan around the virtual point.

7. The apparatus of claim 1, wherein the at least one memory stores instructions that, when executed by the at least one processor, cause the apparatus at least to:
signal a third attribute of the virtual point that is at the center of the at least one patch of the contour mesh, wherein the third attribute of the virtual point that is at the center of the at least one patch of the contour mesh that is signaled comprises an indication of whether the virtual point a vertex at the center of the at least one patch.

8. The apparatus of claim 1, wherein the at least one memory stores instructions that, when executed by the at least one processor, cause the apparatus at least to:
determine another virtual point at a middle position of an inner contour of the at least one patch, when the virtual point is not within the inner contour of the at least one patch; and
triangulate the inner contour of at least one patch with connecting contours of the inner contour of the at least one patch to the another virtual point, to represent the inner contour of the at least one patch as a triangle fan around the another virtual point.

9. The apparatus of claim 1, wherein the at least one memory stores instructions that, when executed by the at least one processor, cause the apparatus at least to:
decimate the segmented mesh so that contour vertices of the mesh of the three-dimensional object data are preserved while generating the contour mesh, to generate triangles around the contours and triangles covering inner vertices of the at least one patch, wherein the triangles around the contours are smaller than the triangles covering the inner vertices of the at least one patch.

10. The apparatus of claim 1, wherein the at least one memory stores instructions that, when executed by the at least one processor, cause the apparatus at least to:
signal the contours of the at least one patch; and
signal virtual points of the plurality of the at least one patch including the virtual point.

11. The apparatus of claim 1, wherein the at least one memory stores instructions that, when executed by the at least one processor, cause the apparatus at least to:
encode a geometry component and a texture component of the at least one patch within at least one padded atlas, wherein the geometry component and the texture component comprise contour vertices and inner vertices; or
encode a geometry component and a texture component of the at least one patch within at least one padded atlas, wherein the geometry component and the texture component comprise inner vertices without contour vertices.

12. The apparatus of claim 1, wherein the at least one memory stores instructions that, when executed by the at least one processor, cause the apparatus at least to:
encode inner geometry values as a residual between an original geometry surface and a prediction surface formed with patches of the contour mesh;
wherein the prediction surface is formed based on a triangulation of a contour, or based on a minimal surface spanned with the contour following projecting the contour on a projection plane of the at least one patch.

13. The apparatus of claim 1, wherein the at least one memory stores instructions that, when executed by the at least one processor, cause the apparatus at least to:

transmit the contour mesh to a decoder as a multiplexing of the contour mesh and a visual volumetric video-based coding bitstream.

14. An apparatus comprising:
at least one processor; and
at least one memory storing instructions that, when executed by the at least one processor, cause the apparatus at least to:
decode, for a frame of three-dimensional object data, a base mesh of the three-dimensional object data, wherein the base mesh has been generated using contours of at least one patch of a mesh of the three-dimensional object data;
wherein the contour mesh of the three-dimensional object data is generated as a result of removing all inner vertices of the mesh of the three-dimensional object data and keeping border vertices, and adding a central point as a virtual point to the at least one patch of the contour mesh that connects to the contours of the at least one patch of the contour mesh;
wherein the base mesh of three-dimensional object data has been encoded into a bitstream using a coding method;
decode, for the frame, the at least one patch of the mesh of the three-dimensional object data, wherein the base mesh comprises a plurality of the at least one patch;
combine patches of the plurality of the at least one patch to reconstruct the mesh of the three-dimensional object data, based on the decoded base mesh and the decoded at least one patch;
receive signaling of a first attribute of the virtual point that is at a center of the at least one patch of the contour mesh, wherein the first attribute of the virtual point that is at the center of the at least one patch of the contour mesh that is signaled comprises a patch index that indicates the at least one patch the virtual point belongs to;
receive signaling of a second attribute of the virtual point that is at the center of the at least one patch of the contour mesh, wherein the second attribute of the virtual point that is at the center of the at least one patch of the contour mesh that is signaled comprises an indication of whether the virtual point is related to an external contour of the at least one patch or an inner contour of the at least one patch;
wherein the at least one patch is decoded using the patch index that indicates the at least one patch the virtual point belongs to, and the indication of whether the virtual point is related to an external contour of the at least one patch or an inner contour of the at least one patch.

15. The apparatus of claim 14, wherein the at least one memory stores instructions that, when executed by the at least one processor, cause the apparatus at least to:
remove central points and triangles from the base mesh; and
keep contours of the mesh, and for a contour, keep a list of patches the contour belongs to.

16. The apparatus of claim 14, wherein the at least one memory stores instructions that, when executed by the at least one processor, cause the apparatus at least to:
predict a surface of the at least one patch based on received signaling;
wherein the at least one patch of the three-dimensional object data is decoded using the predicted surface.

17. The apparatus of claim 14, wherein patches of the plurality of the at least one patch are combined with fusing a position of a patch pixel at a boundary of the decoded patch with a closest three-dimensional point of the base mesh.

18. The apparatus of claim 14, wherein the at least one memory stores instructions that, when executed by the at least one processor, cause the apparatus at least to:
demultiplex the base mesh of the three-dimensional object data and a visual volumetric video-based coding bitstream.

19. An apparatus comprising:
at least one processor; and
at least one memory storing instructions that, when executed by the at least one processor, cause the apparatus at least to:
signal within a bitstream a flag indicating the presence of a multiplexed contour mesh of three-dimensional object data;
signal within the bitstream whether the contour mesh has been predictively encoded;
signal within the bitstream a predictive function, in response to the contour mesh having been predictively encoded;
signal within the bitstream a flag indicating whether delta values have been encoded for geometry data of the contour mesh;
signal contour points used to combine patch borders of the contour mesh;
wherein the contour mesh of the three-dimensional object data is generated as a result of removing all inner vertices of the mesh of the three-dimensional object data and keeping border vertices, and adding a central point as a virtual point to the at least one patch of the contour mesh that connects to the contours of the at least one patch of the contour mesh;
signal a first attribute of the virtual point that is at a center of the at least one patch of the contour mesh, wherein the first attribute of the virtual point that is at the center of the at least one patch of the contour mesh that is signaled comprises a patch index that indicates the at least one patch the virtual point belongs to; and
signal a second attribute of the virtual point that is at the center of the at least one patch of the contour mesh, wherein the second attribute of the virtual point that is at the center of the at least one patch of the contour mesh that is signaled comprises an indication of whether the virtual point is related to an external contour of the at least one patch or an inner contour of the at least one patch.

20. The apparatus of claim 19, wherein the bitstream comprises a visual volumetric video-based coding bitstream.

* * * * *